United States Patent [19]

Franklin et al.

[11] Patent Number: 4,983,320

[45] Date of Patent: Jan. 8, 1991

[54] DIALKYL DICARBONATES AS BLOWING AGENTS FOR POLYMERS

[75] Inventors: Ralph Franklin; William J. Parr, both of Naperville, Ill.; Gerald Fesman, Teaneck, N.J.; Barry A. Jacobs, Bethel, Conn.

[73] Assignee: Akzo N.V., Arnhem, Netherlands

[21] Appl. No.: 353,852

[22] Filed: May 18, 1989

[51] Int. Cl.$^5$ .............................................. C09K 3/00
[52] U.S. Cl. ..................................... 252/350; 521/94; 521/97; 521/129; 521/130
[58] Field of Search .................... 521/130, 129, 94, 97; 252/350

[56] References Cited

U.S. PATENT DOCUMENTS

| | | | |
|---|---|---|---|
| 3,573,232 | 3/1971 | Kloker et al. | 260/2.5 |
| 3,573,233 | 3/1971 | Alfes et al. | 260/2.5 |
| 4,070,310 | 1/1978 | Schneider et al. | 260/2.5 |
| 4,110,273 | 8/1978 | Cohnen | 521/59 |
| 4,297,442 | 10/1981 | Blahak | 521/107 |

FOREIGN PATENT DOCUMENTS 2220564  3/1973  France .

Primary Examiner—Morton Foelak
Attorney, Agent, or Firm—Louis A. Morris

[57] ABSTRACT

The present invention pertains to a composition of matter and to a method of using the composition to produce foamed plastics, wherein a major, auxiliary source of blowing agent for the foam is the decomposition of dialkyl dicarbonates. The dialkyl dicarbonates can be decomposed over temperatures ranging from about 10° C. to about 45° C. when used in combination with particular tertiary amine decomposition catalysts.

5 Claims, No Drawings

DIALKYL DICARBONATES AS BLOWING AGENTS FOR POLYMERS

BACKGROUND OF THE INVENTION

1. Field of the Invention

The present invention pertains to the use of dialkyl dicarbonates combined with decomposition catalysts as blowing agents for polymeric compositions which rapidly progress from a fluid to a rigid physical form over a time-temperature profile which is inadequate to provide substantial thermal decomposition of the dicarbonates.

2. Background of the Invention

Blowing agents are used in combination with polymers to produce polymeric foams. Polymeric foams having broad application include, for example, urethane forms, polyester foams, and foams comprising polyvinyl chloride. Blowing agents for polymers fall into two categories, chemical blowing agents and physical blowing agents. Commercially used chemical blowing agents are dominated by azodicarbonamide and physical blowing agents by chlorofluorocarbons and methylene dichloride; both of these compound types have toxicological and ecological problems associated with them.

It would be desirable to have a blowing agent for polymers which comprises carbon dioxide, since this blowing agent is non-toxic and environmentally acceptable. Many organic compounds when heated evolve carbon dioxide; unfortunately, the temperature at which this occurs precludes their use in many polymeric foaming applications. However, there are particular organic compounds which can be made to decompose, releasing carbon dioxide, at lower temperatures when used in combination with a suitable decomposition catalyst.

U.S. Pat. No. 3,573,232 to Kloeker et al., issued Mar. 30, 1971, describes a process for the production of polyester foamed materials. A copolymerizable mixture of unsaturated polyesters and monomeric vinyl compound employs as a foaming agent a carbonic acid ester anhydride. A polyvalent metal compound is used as a catalyst to cause decomposition of the anhydride without the application of a substantial amount of heat.

U.S. Pat. No. 3,573,233 to Krefeid et al., issued Mar. 30, 1971 discloses a process of producing foamed materials from a copolymerizable mixture of unsaturated polyesters and a monomeric polymerizable vinyl compound employing as a foaming agent a carbonic acid ester anhydride. Particular amine compounds consisting of a primary or an acyclic or cyclic secondary or an acyclic or cyclic tertiary amine with alkyl, alkenyl, or alkenyl radicals or its quaternary ammonium base or a primary or secondary N-monoaryl amine are used as catalysts to cause decomposition of the anhydride without the application of a substantial amount of heat.

U.S. Pat. No. 4,070,310 to Schneider et al., issued Jan. 24, 1978 describes the use of a process for the production of polyurethane foams preferably having a compact surface, in which process a mixture of polyisocyanates and compounds which liberate carbon dioxide under the catalytic influence of basic compounds is reacted with organic compounds containing hydrogen atoms which are reactive with isocyanate groups in a closed mould. The organic compounds containing reactive hydrogen atoms are mixed with basic compounds and/or have basic compounds chemically built into them; the reaction can be carried out in the presence of auxiliary agents and additives which are known in the chemistry of polyurethane foams. The reaction which generates carbon dioxide is carried out in the presence of water and/or organic blowing agent. The presence of the carbon dioxide increases the time period the foam is in a low viscosity state, thus improving the flow properties of the foamable mixture.

The organic compounds which split off carbon dioxide under the catalytic influence of basic compounds include pyrocarbonic acid dimethylester, pyrocarbonic acid diethyl ester, pyrocarbonic acid dibutyl ester, pyrocarbonic acid dioctadecyl ester, acetic acid - carbonic acid ethyl ester anhydride, propionic acid - carbonic acid - ethyl ester anhydride, sebacic acid - bis (carbonic acid methyl ester) - anhydride, adipic acid-bis-(carbonic acid methyl ester) - anhydride, crotonic acid-carbonic acid-methyl ester - anhydride and the like. The use of carbonic acid ester anhydrides or mixed anhydrides and basic compounds to produce carbon dioxide is said to be unsuitable as the sole blowing agent for the foam, particularly for moulded foam products.

Carbonic acid esters and ester anhydrides are used in combination with any inorganic or organic compounds which are basic in reaction, to produce the carbon dioxide. Examples of basic compounds used as decomposition catalysts include alkali metal hydroxide or alcoholates such as sodium hydroxide, potassium hydroxide, sodium ethylate and potassium methylate and salts which are basic in reaction. Preferred basic compounds are tertiary amines. Examples of such amines include triethylamine, dimethylbenzyl amine, permethylated diethylene triamine and triethylene diamine.

U.S. Pat. No. 4,110,273 to Cohnen et al., issued Aug. 29, 1978 discloses a blowing agent composition consisting of 1,4 butan-diol-bis- (carbonic acid ester-benzoic acid anhydride) and silicon dioxide. The silicon dioxide is credited with reducing the decomposition temperature of the anhydride while increasing the yield of gas substantially. This blowing agent is used for foaming thermoplastics such as polycarbonates, polyesters, polyamides, and mixtures of polyphenylene ethers and polystyrene at temperatures ranging from about 160° C. to about 300° C.

U.S. Pat. No. 4,297,442 to Blahak, issued Oct. 27, 1981, describes cellular elastomeric foams produced by foaming a polyurethane or a polyurethane prepolymer crosslinked with a polyamine chain lengthening agent in the presence of an organic expanding agent containing at least in par a gas forming component which reacts with the polyamine chain lengthening agent or with the products of reaction thereof with polyisocyanates and split-off gas. The organic expanding agents include organic solvents and components that decompose at temperatures above room temperature (e.g. 55° C.), splitting off gases on decomposition. Examples of expanding agents which react with amine chain lengtheners or with the reaction product of the chain lengthener with polyisocyanates include dicarbonic-acid dialkylesters, alkyl carbaminates and Leusche anhydrides.

French patent application, Publication No. 2,220,564, by Societe Nationale des Poudres et Explosifs, filed Mar. 6, 1973 describes organic dicarbonates useful as blowing agents for plastic materials. Particularly the application pertains to use dicarbonates comprising a t-butyl group or two isopropyl groups, since these dicarbonates are said to be transformed almost completely into gas on decomposition, whereas other dicarbonates typically are not. In addition, the present of the t-butyl group is shown to provide a pronounced reduction in the decomposition temperature of the dicarbonate, with maximum gas production taking place at about 140 C. The subject matter of this publication provides background information helpful in understanding the present invention and is hereby incorporated by reference.

The majority of art cited above uses gas forming components which initiate the gas generation at temperatures only above about 90° C., with one example at about 55° C. However, there are numerous applications for which a foam generating component which is active at lower temperatures such as ambient (room) temperature is desired.

In addition to having a gas generating agent which functions at room temperatures, (over a range from about 10° C. to about 45° C.) it is important to have the time period required to create the foam be balanced with the polymer gellation time. The foam creation time period for the decomposition of pyrocarbonic acid esters and carbonic acid ester anhydrides at the processing (reaction) temperature of the polymeric composition is of critical importance in the production of foamed polymeric systems which rely on the decomposition process as a major source of blowing agent.

SUMMARY OF THE INVENTION

The present invention comprises a composition of matter and to a method of using the composition to produce foamed plastics, wherein a major, auxiliary source of blowing agent for the foam is the decomposition of dialkyl dicarbonates. In particular, the invention pertains to providing well defined decomposition of the dialkyl dicarbonates over the temperature range during which a crosslinking polymer system can be expanded. The dialkyl dicarbonates can be decomposed over temperatures ranging from about 10° C. to about 200° C. when used in combination with particular amine decomposition catalysts. Selected combinations of the alkyl substituent end groups of the dicarbonate molecule and particular decomposition catalysts have been discovered which enable foam creation for polymer systems which tend to change from a fluid to a rigid, foamed form over relatively short time periods (have a short gellation period), ranging from seconds to a few minutes (e.g. 25 sec. to about 3 min.), such as polyurethanes and unsaturated polyesters.

The dialkyl dicarbonates which perform well in the present invention are not limited to particular alkyl substituent groups and need not be symmetrical in composition. Typical dialkyl dicarbonates which have been decomposed successfully to produce carbon dioxide gas over the above temperature range include, for example, di-ethyl dicarbonate, di-isopropyl dicarbonate, di-isobutyl dicarbonate, t-butyl methyl dicarbonate, t-butyl ethyl dicarbonate and combinations thereof. Preferred dialkyl dicarbonates include di-isobutyl dicarbonate and t-butyl methyl dicarbonate which perform especially well in polyurethane applications. It is preferred to use a tertiary substituent alkyl group, in cases when it is desired to take advantage of the thermal decomposition capability of such substituent groups. Halogenated substituent alkyl groups can be used when it is desired to incorporate halogens into the foam for thermal conductivity purposes. The preferred halogens are chlorine and fluorine, with fluorine being most preferred.

In addition, dicarbonates having a linking group which enables the generation of two molecules of carbon dioxide per molecule of dicarbonate are particularly useful. The linking group is selected from groups having the formula:

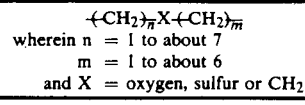
wherein n = 1 to about 7
m = 1 to about 6
and X = oxygen, sulfur or $CH_2$ Examples cf dicarbonates comprising a linking group which are expected to perform well in polyurethane foams include, for example, di t-butyl digol dicarbonate [diethylene glycol bis(t-butyl dicarbonic acid ester)]and di t-amyl digol dicarbonate, n-butyl t-butyl digol dicarbonate (diethylene glycol n-butyl t-butyl dicarbonic acid diester), t-butyl ethyl digol dicarbonate, t-butyl allyl digol dicarbonate, diisopropyl digol dicarbonate, isopropyl methyl digol dicarbonate and mixtures thereof.

The amines used to promote or catalyze decomposition of the dialkyl dicarbonates are selected from tertiary amines having at least one sterically accessable nitrogen which exhibits high nucleophilicity. Such tertiary amines include, for example, molecules having a bridgehead nitrogen wherein a cyclic structure has a nitrogen at the junction between two fused cyclic ring structures; tertiary 4-amino derivatives of pyridine; dimethyl alkyl amines; and poly dimethyl alkyl amines containing linking groups. Preferred examples of the tertiary amines referred to above include, respectively, triethylene diamine and quinuclidine; 4-(dimethyl amino) pyridine and 4-(4-methyl-1-piperidinyl)- pyridine; bis(2-dimethyl aminoethyl) ether, tetramethyl ethylene diamine and tetramethyl hexamethylene diamine; and 1,3,5-tris[3-(dimethylamino)propyl]hexahydro-s-triazine. Combinations of the kinds of decomposition catalysts described above can also be used, in particular to tailor decomposition rate over a given temperature profile.

DETAILED DESCRIPTION OF THE INVENTION

The thermal decomposition of dicarbonates having the general structure:

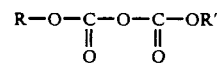

wherein R and R' are alkyl functional groups, has been studied and is considered to proceed via cleavage of an internal carbon oxygen bond followed by loss of carbon dioxide. The alkyl substituents affect both the temperature at which decomposition occurs and the gas yield. Thus, t-butyl and t-amyl dicarbonates decompose over a temperature range of about 100-195° C. with the liberation of three moles of gas per mole of dicarbonate, whereas isopropyl and isobutyl dicarbonates decompose over a temperature range of about 180°-250° C. and n-alkyls decompose over a range of about 200°-220° C., both yielding only one mole of gas per mole of dicarbonate. The facile decomposition of t-butyl dicarbonates is believed to be promoted by the formation of the t-butyl carbonium ion and its subsequent decomposition to isobutene.

The mechanism for dicarbonate catalyst-assisted room temperature decomposition has been discovered to differ very significantly from the mechanism of dicarbonate thermal decomposition. So that a quite unexpected combination of alkyl substituents and catalyst structure provides the most rapid formation of foam in a fluid polymeric system.

Polymeric systems which react rapidly over a period of a few seconds to a few minutes to produce a gelled, substantially rigid polymer structure include polymers such as polyurethanes, and unsaturated polyesters though the present invention can be applied to any similar polymeric systems, the examples presented below are based on polyurethane.

Flexible polyurethane foams have been produced using the decomposition of dicarbonates as a major source of blowing agent. The principal source of blowing agent was typically from the reaction between water and isocyanate. The decomposition of dicarbonates contributed to softness of the flexible foam as well as to blowing of the foam. For example, the water-isocyanate reaction alone, in a flexible polyurethane foam formulation of the kind discussed subsequently, produces a polyurethane foam having a density of about 2 lb/ft$^3$. Use of the dicarbonate decomposition reaction in combination with the water-isocyanate reaction produces a polyurethane foam having a highly desirable softness and a density of about 1.5 lb/ft$^3$ or below. Dicarbonates investigated as blowing agents included diisobutyl dicarbonate, diisopropyl dicarbonate, diethyl dicarbonate, t-butyl methyl dicarbonate, t-amyl n-butyl dicarbonate, diethylene glycol bis(t-amyl dicarbonic acid ester), and diethylene glycol bis(t-butyl dicarbonic acid ester). Although several of these dicarbonates are symmetrical in functional alkyl groups, this is not a requirement for the composition of the present invention. The use of a t-butyl or t-amyl functional alkyl group does not decrease the temperature at which catalytically assisted decomposition of the dicarbonate begins; however, in applications where the reaction temperature of the polymer/foam mixture exceeds 100° C., it may be possible to benefit from some thermal decomposition of the dicarbonate with an accompanying liberation of two to three moles of gas per mole of dicarbonate.

The use of a linking group between the carbonate portions of the dicarbonate molecule enables the production of two molecules of carbon dioxide per molecule of dicarbonate, as opposed to a single molecule of carbon dioxide per molecule of dicarbonate when the linking group is not present.

Thus, by tailoring the dialkyl dicarbonate comprised molecule, it is possible to obtain the onset of catalyzed decomposition of the molecule at about room temperature, and to take advantage of the exothermic reaction of the polyurethane formation to achieve at least a limited amount of thermal decomposition when t-butyl, t-amyl or similar t-alkyl substituents are used.

It is important that at least the majority of the dicarbonate be catalytically decomposed prior to reaching the thermal decomposition temperature of the dicarbonate, when the polyurethane gellation-time profile is such that the polyurethane has reached a highly viscous form at the onset of thermal decomposition. A release of a large quantity of gas at this time can crack a relatively rigid foam structure. Thus, the dialkyl dicarbonate molecule must be tailored to perform properly with the particular polyurethane gellation reaction.

The cream time (time between the discharge of the polymeric/foam-producing ingredients from the foam head of a conventional foam manufacturing machine and the beginning of the foam rise) for formulations subsequently discussed typically ranged from about 5 seconds to about 8 seconds at room temperature. At the beginning of the foam rise, the surface of the polymeric/foam-producing liquid will change color, usually becoming lighter, due to evolution of the blowing agent. The rise time (time between the beginning of the foam rise, cream time, and the time at which the foam rise is complete) typically ranged between about 75 seconds and about 100 seconds at room temperature.

The term gel point or gellation as used herein means the reaction of the polymer system has progressed to the extent that the resulting polymer network is infinite within the foam. The term cure time as used herein means the length of time required for sufficient completion of reaction to generate the desired polymer strength and dimensional stability.

The decomposition catalyst used in combination with the dialkyl dicarbonate blowing agent must comprise an amine having particular structural characteristics wherein at least one nitrogen group is readily available for ease of reaction. Tertiary amines having at least one sterically accessable nitrogen which exhibits high nucleophilicity perform well as decomposition catalysts. Such tertiary amines include, for example, molecules having a bridgehead nitrogen, wherein a cyclic structure has a nitrogen at the junction between two fused cyclic ring structures (such as triethylene diamine and quinuclidine); tertiary 4-amino derivatives of pyridine (such as 4-(dimethyl amino) pyridine and 4-(4-methyl-1-piperidinyl)pyridine); dimethyl alkyl amines (such as bis(2-dimethyl aminoethyl) ether, tetramethyl ethylene diamine, and tetramethyl hexamethylene diamine); and poly dimethyl alkyl amines containing linking groups (such as 1,3,5-tris[3-(dimethylamino)propyl] hexahydro- s-triazine). These particular amines are used because their structural characteristics enable them to catalyze the rapid decomposition of dialkyl dicarbonates at temperatures as low as 10° C. Other amines can enable the decomposition of dialkyl dicarbonates in the range of room temperature, however, the rate of decomposition is considerably slower so the ability of the catalyst/dicarbonate blowing agent combination to adequately perform with a polymer system which gels rapidly is reduced.

It is the combination of the dialkyl dicarbonate comprised blowing agent with the catalysts capable of providing rapid decomposition (e.g., greater than 100 ml/min./g. at decomposition temperature and atmospheric pressure) over a temperature range of about 10° C. to about 45° C., which provides the foaming system of the present invention.

EXAMPLES

Symmetrical dialkyl dicarbonates can be prepared by contacting an alkyl haloformate and an alkali metal carbonate in the presence of a crown ether and a suitable solvent. This synthesis technique is described in detail in U.S. patent application Ser. No. 07/281,123, assigned to the assignee of the present invention, which is hereby incorporated by reference. For example, diisopropyl dicarbonate was prepared as follows:

A 1 liter, 3-necked flask was equipped with a reflux condenser, dropping funnel, thermometer, mechanical stirrer and calcium chloride drying tubes. The flask was charged with 70 g (0.51 mole) of powdered, anhydrous potassium carbonate; 2 g (0.0076 mole) 18-crown-6 ether and 250 ml of acetonitrile. The reaction mixture was efficiently stirred while 122.5 g (1 mole) of isopropyl chloroformate was added dropwise at such a rate as to maintain a reaction temperature of not more than 40° C. The reaction mixture was stirred for a total of 6 hours and then allowed to stand overnight prior to work up.

The reaction mixture was worked-up by filtering off the inorganic salts and removing the solvent on a rotary evaporator at 30° C. using a water aspirator to provide the vacuum. The resulting liquid was dissolved in 200–300 ml of dichloromethane and washed twice with 100 ml portions of water. After drying over magnesium sulphate, filtering, and stripping of solvent, 80.7 g of a clear liquid was obtained. Analysis by Carbon-13 NMR showed the crude product to consist of almost entirely di-isopropyl dicarbonate. Careful vacuum distillation of the crude product gave 77.4 g (0.41 mole) of pure di-isopropyl dicarbonate (boiling point 44°–48° C. at 0.25 mm Hg; overall yield 82%).

Non-symmetrical dicarbonates were prepared using a standard procedure for synthesizing such mixed anhydrides, which is well known in the art, see French patent application, Publication No. 2,220,564 previously incorporated by reference, and therefore the procedure is not described in detail herein. Table 1, which follows, illustrates some of the dicarbonates made by this route. Products were purified by vacuum distillation where possible, otherwise they were left in a crude state.

TABLE 1

$$\text{ROCOCOR'}\ \begin{matrix}\text{O}\ \text{O}\\ \|\ \|\end{matrix}\ \text{wherein}$$

| R | R' |
|---|---|
| $^n$Bu | 2-methoxy ethyl |
| $^n$Bu | $^i$Pr |
| $^n$Bu | $^n$Bu |
| $^t$Bu | Me |
| $^t$Bu | Et |
| $^t$Bu | $^i$Pr |
| $^t$Bu | $^n$Bu |
| $^t$Bu | Allyl |
| $^t$Bu | 2-Ethylhexyl |
| $^t$Amyl | $^n$Bu |
| $^t$Amyl | $^i$Bu |
| $^i$Bu | $^i$Bu |
| 2 × $^t$Bu | —CH$_2$CH$_2$OCH$_2$CH$_2$— |
| 2 × $^i$Pr | —CH$_2$CH$_2$OCH$_2$CH$_2$— |
| 2 × $^t$Amyl | —CH$_2$CH$_2$OCH$_2$CH$_2$ |

EXAMPLE 1

Preliminary screening of dialkyl dicarbonate/catalyst systems for blowing agent activity in room-temperature initiated flexible polyurethane foam production was accomplished using a 1.25 lb/ft$^3$ density foam formulation similar to formulations used to produce furniture. Further evaluation was done using an automotive type formulation. Both formulations are given below in Table 2.

TABLE 2

FLEXIBLE POLYURETHANE FOAM FORMULATIONS

| Component | Furniture Formula Parts by Weight | Automotive Formula Parts by Weight |
|---|---|---|
| Niax 1656 Polyol | 100.00 | 100.00 |
| Niax L5740 Silicone | 1.10 | 1.40 |
| NEM Amine Catalyst | 0.20 | 0.20 |
| 33 LV Amine Catalyst | 0.30 | 0.30 |
| T-10 50% Stannous Octoate | 0.45 | 0.35 |
| Dialkyl Dicarbonate | 3.50 | 3.00 |
| Water | 4.50 | 3.85 |
| TDI 80/20 | 58.95 | 51.45 |
| Index (TDI) | 112 | 111 |

The Polyol 1656® is a polyether polyol available from Union Carbide Corp. The L5740 Silicone® is an organo silicon available from Union Carbide Corp. which was used to stabilize the foam while the foam was rising. This surfactant affects the final cell structure of the foam. NEM Amine Catalyst® is an N-ethyl morpholine available from from Texaco Chemicals. The NEM catalyst was used primarily to catalyze the isocyanate-water reaction and to produce urea linkages. 33 LV Amine Catalyst® is a triethylene diamine available from Air Products Inc. This catalyst was used to decompose the dialkyl dicarbonate blowing agent, catalyze the isocyanate-water reaction, and to create linkages. T-10 50% Stannous Octoate® is available from Air Products Inc., and was used in the formulation as a catalyst to accelerate the Polyol/TDI (isocyanate) reaction. The dialkyl dicarbonate blowing agent most frequently used was di-isobutyl dicarbonate. Water was used in the formulation to react with isocyanate, generating amines and carbon dioxide gas. This amine subsequently reacts with additional isocyanate to yield urea linkages. The carbon dioxide gas generated by the water reaction provides blowing agent action, but was used in combination with the dicarbonate blowing agent to provide the total gaseous components necessary for foam formation. TDI 80/20® is a toluene di-isocyanate available from Mobay Chemical Co. which was used to react with the polyol to form urethane and to react with water and amines to form crosslinks with or branches from polyurethane molecules. The TDI index of the TDI 80/20 indicates the stoichiometry of the reaction, e.g., an index of 112 indicates that 12% more TDI than the necessary stoichiometric amount was used. The excess TDI contributes to additional crosslinking, and thus firmness of the foam.

Preliminary evaluation, in the form of individual laboratory batch foam production, required development of a method for mixing the formulation so the blowing agent would not decompose too early in the reaction, prior to substantial formation of reacted, polyurethane. In the Furniture formulation, the dicarbonate was added with the TDI while the catalyst for decomposition of the dicarbonate was added to the mixture of other ingredients to which the TDI/dicarbonate mixture was subsequently added. In the Automotive Formulation, a polyol/dicarbonate premix was made, the stannous octoate polymerization catalyst was added to these ingredients while they were mixing and the water solution including silicon surfactant, NEM amine catalyst and 33LV amine catalyst were added simultaneously with the TDI at separate addition positions to the polyol/dicarbonate premix.

A typical manufacturing line would comprise equipment having a mixing head into which several individual ingredients can be added separately, mixed in the head and deposited immediately upon a surface outside the head. For purposes of manufacturing, it is preferred to use a single highly active amine catalyst such as the 33 LV Amine Catalyst to decompose the dicarbonate blowing agent, catalyze the isocyanate-water reaction and produce crosslinking linkages, simultaneously. However, a dual amine catalyst system can be used to tailor the foaming rate to the polyurethane reaction rate, specifically. In the dual catalyst system it is always necessary to have a highly active amine catalyst, e.g., 33 LV, present, with an optional amount of a lower activity amine catalyst, e.g., NEM.

Methylene chloride, a blowing agent commonly used in the industry, was used in place of the dicarbonate blowing agent in laboratory batch foam preparation using the formulations provided above, for comparative purposes. The methylene chloride was mixed into the polyol and other ingredients were subsequently added to the mixture. Presently urethane foam manufacturers are seeking a replacement for methylene chloride which is considered to be a health hazard in the working environment.

In the Furniture Formulation, all the dicarbonates evaluated showed a blowing efficiency at least equivalent to methylene chloride. In the Automotive Formulation, the dicarbonates showed similar efficiency to methylene chloride but the foam produced was softer as indicated by indentation force deflection (IFD). Properties of the cured polyurethane foams produced using the automotive type formulations shown in Table 2 are provided in Table 3. In addition to the highly desirable softness characteristic of the foam, the chief advantage of the dicarbonate blowing agents is their desirability based on environmental considerations.

TABLE 3
Dicarbonates as Blowing Agents for Flexible Urethane Foam
AUTOMOTIVE TYPE FORMULA

| Auxiliary Blowing Agent | Catalyst | Density Pounds Per Cubic Ft. (pcf) | Breathability* Air Flow (cf/min) | Indentation Force Deflection (pounds) | Compression Set Resistance |
| --- | --- | --- | --- | --- | --- |
| Blowing Agent | — | 1.42 | 4.5 | 32.1 | Excellent |
| Ethylene Chloride | — | 1.25 | 6.1 | 23.3 | Excellent |
| ethyl dicarbonate | triethylene diamine | 1.29 | 4.5 | 19.4 | Poor |
| isopropyl dicarbonate | triethylene diamine | 1.25 | 6.3 | 15.9 | Good |
| isobutyl dicarbonate | triethylene diamine | 1.26 | 6.5 | 16.9 | Good |
| butylmethyl dicarbonate | triethylene diamine | 1.29 | 5.9 | 17.2 | Fair |

*An indication of foam porosity measured by passing air through the foam.

EXAMPLE 2

The catalyzed Dialkyl dicarbonate blowing agents have also been successfully used to produce rigid polyurethane foams. Di-isobutyl dicarbonate was investigated in a rigid polyurethane foam as described below, again symmetrical substituent groups on the dicarbonate blowing agent are not required. The catalyst used in combination with the dicarbonate blowing agent was triethylene diamine.

Preliminary screening of the dicarbonate/catalyst system as a blowing agent for room-temperature initiated polyurethane foam production was accomplished using the rigid foam formulation shown in Table 4.

TABLE 4

| RIGID POLYURETHANE FOAM FORMULATIONS | | |
| --- | --- | --- |
| Component | Standard Formulation Weight Percent | Dialkyl Dicarbonate Formulation Weight Percent |
| A Component | | |
| Mondur MR | 50.2 | 50.2 |
| Blowing Agent F-11B | 1.5 | |

TABLE 4-continued

| RIGID POLYURETHANE FOAM FORMULATIONS | | |
| --- | --- | --- |
| Component | Standard Formulation Weight Percent | Dialkyl Dicarbonate Formulation Weight Percent |
| Dialkyl Dicarbonate | | 17.0 |
| B Component | | |
| Polyol R 650 | 31.9 | 31.9 |
| Surfactant DC 193 | 0.5 | 0.5 |
| Polycat 41 Amine Catalyst | 0.7 | 0.7 |
| Tin Catalyst T-45 | 0.7 | 0.7 |
| Blowing Agent F-11B | 14.5 | |

The Polyol R650® is an amine aromatic-based polyol available from ARCO, Texaco Division. The DC 193 Surfactant is a silicone available from Dow Corning Co. Polycat 41 Amine Catalyst is 1,3,5-tris [3-(dimethylamino)propyl] hexahydro-s-triazine available from Air Products Corp. Mondur MR is a polymeric isocyanate available from Mobay Chemical Co. and was used to react with the polyol. Blowing Agent F-11B is a monofluorotrichloromethane available from Pennwalt Corp. The dialkyl dicarbonate used was di-isobutyl dicarbonate.

In the laboratory evaluation component A and component B were mixed separately and then the two components were mixed together. The density of the polyurethane foam produced using the formulations shown in Table 4 was 3 lb/ft$^3$ in each case.

In another evaluation, the amount of F-11B blowing agent in Component B was reduced to 8 parts and the F-11B blowing agent in Component A was replaced with 3 parts of di-isobutyl dicarbonate. The foam produced using this mixture of blowing agents exhibited a density of about 3 lb/ft$^3$. This latter combination of blowing agents permits a reduction in the amount of chlorofluorocarbon blowing agent used while providing a rigid polyurethane foam exhibiting heat transfer characteristics useful for insulation applications. As previously discussed, it is believed halogenated or polyhalogenated substituent alkyl groups on the dicarbonate molecule can be used to provide rigid polyurethane having heat transfer characteristics useful for insulation applications without the use of chlorofluorocarbon blowing agents.

Only a limited number of preferred embodiments of the invention have been described above. However, one skilled in the art will recognize that numerous substitutions, modifications and alterations are permissable without departing from the spirit and scope of the invention as limited by the following claims.

What is claimed is:

1. A catalyzed blowing agent composition for use in producing polymeric foams, wherein the polymeric reactants initiate reaction at about room temperature and wherein the catalyzed blowing agent composition comprises:

(a) at least one blowing agent comprising a dialkyl dicarbonate selected from the group consisting of diisopropyl dicarbonate, diisobutyl dicarbonate, t-butylmethyl dicarbonate, dicarbonates having alkyl substituent end groups containing from 1 to 10 carbon atoms with at least one of said end groups being a tertiary alkyl and dicarbonates having alkyl substitutent end groups having a linking group between the dicarbonate portions of the molecule having the formula $-(CH_2)_n-O-(CH_2)_m$ wherein n=1 to about 7, m=1 to about 6; and (b) at least one dicarbonate decomposition catalyst comprising a tertiary amine having at least one sterically accessable nitrogen which exhibits high nucleophilicity selected from the group consisting of tertiary amine molecules having a bridgehead nitrogen, tertiary 4-amino derivatives of pyridine, dimethyl alkyl amines, poly dimethyl alkyl amines containing linking groups, and combinations thereof, the combination of dialkyl dicarbonate and decomposition catalyst being selected so as to be capable of providing decomposition greater than 100 ml/min/g over a temperature range of about 10° C. to about 45° C.

2. The catalyzed blowing agent composition of claim 1 wherein said decomposition catalyst comprises a tertiary amine selected from the group consisting of triethylene diamine, quinuclidine, 4-(dimethyl amino)pyridine, 4-(4-methyl-1-piperdinyl)-pyridine, bis(2-dimethyl aminoethyl) ether, tetramethyl ethylene diamine, tetramethyl hexamethylene diamine, 1,3,5-tris[3-(dimethylamino)propyl] hexahydro-s-triazine, and combinations thereof.

3. The catalyzed blowing agent composition of claim 1 wherein said linking group comprises a diethylene glycol.

4. The catalyzed blowing agent of claim 1 wherein said alkyl substitutent is halogenated or polyhalogenated.

5. The catalyzed blowing agent of claim 4 wherein the halogen is chlorine or fluorine.

* * * * *